(12) United States Patent
Michioka et al.

(10) Patent No.: US 8,231,274 B2
(45) Date of Patent: Jul. 31, 2012

(54) MOTION GUIDE DEVICE, TABLE APPARATUS, AND DAMPING METHOD FOR MOTION GUIDE DEVICE

(75) Inventors: Hidekazu Michioka, Tokyo (JP);
Masahiko Yoshino, Tokyo (JP);
Mitsuaki Homma, Tokyo (JP); Satoru Nagai, Tokyo (JP)

(73) Assignee: THK Co., Ltd., Tokyo (JP)

( * ) Notice: Subject to any disclaimer, the term of this patent is extended or adjusted under 35 U.S.C. 154(b) by 992 days.

(21) Appl. No.: 11/719,352

(22) PCT Filed: Oct. 31, 2005

(86) PCT No.: PCT/JP2005/019981
§ 371 (c)(1),
(2), (4) Date: Aug. 25, 2008

(87) PCT Pub. No.: WO2006/051707
PCT Pub. Date: May 18, 2006

(65) Prior Publication Data
US 2009/0161996 A1    Jun. 25, 2009

(30) Foreign Application Priority Data

Nov. 15, 2004 (JP) .................................. 2004-331221
Oct. 28, 2005 (JP) .................................. 2005-315299

(51) Int. Cl.
*F16C 33/10* (2006.01)
*F16C 29/06* (2006.01)

(52) U.S. Cl. .................... 384/13; 384/8; 384/15; 384/43
(58) Field of Classification Search .......... 384/8, 13–15, 384/43–45
See application file for complete search history.

(56) References Cited

U.S. PATENT DOCUMENTS 4,968,155 A    11/1990  Bode
5,102,235 A *  4/1992  Mugglestone ................. 384/45
(Continued)

FOREIGN PATENT DOCUMENTS

DE    10-2006-015478 A1 * 10/2007
(Continued)

OTHER PUBLICATIONS

International Search Report of PCT/JP2005/019981, date of mailing Jan. 31, 2006.

*Primary Examiner* — Marcus Charles
(74) *Attorney, Agent, or Firm* — Westerman, Hattori, Daniels & Adrian, LLP

(57) ABSTRACT

A motion guide device that has a novel damping structure different from the conventional damping structure is provided. The present invention comprises a raceway member (1) having a rolling-element rolling part (1a); a moving member (2) having a loaded rolling-element rolling part (2a) facing the rolling-element rolling part (1a) and being allowed to make a linear or curved movement relatively to the raceway member (1); and a plurality of rolling elements (3) intervening between the rolling-element rolling part (1a) of the raceway member (1) and the loaded rolling-element rolling part (2a) of the moving part (2). A gap (16) between the raceway member (1) and the moving member (2) is filled with a layer of oil contacting the raceway member (1) and the moving member (2). Viscosity resistance of the oil is utilized to apply a braking force to the moving member (2) or the raceway member (1) in proportion to a speed.

11 Claims, 17 Drawing Sheets

U.S. PATENT DOCUMENTS

| | | | |
|---|---|---|---|
| 5,267,796 A * | 12/1993 | Nonaka et al. | 384/43 |
| 5,273,364 A | 12/1993 | Hara | |
| 5,492,413 A * | 2/1996 | Tsukada | 384/15 |
| 6,155,717 A * | 12/2000 | Michioka et al. | 384/15 |
| 6,200,031 B1 * | 3/2001 | Faulhaber et al. | 384/45 |
| 6,210,040 B1 * | 4/2001 | Mischler | 384/45 |
| 6,461,045 B1 * | 10/2002 | Kamimura et al. | 384/13 |
| 6,558,039 B2 * | 5/2003 | Wu | 384/45 |
| 6,705,430 B2 * | 3/2004 | Michioka et al. | 184/5 |
| 6,877,900 B2 * | 4/2005 | Mochizuki et al. | 384/15 |
| 2002/0021847 A1 * | 2/2002 | Wu | 384/45 |
| 2002/0027044 A1 * | 3/2002 | Michioka et al. | 184/5 |
| 2007/0223845 A1 * | 9/2007 | Kakei et al. | 384/15 |

FOREIGN PATENT DOCUMENTS

| | | | |
|---|---|---|---|
| JP | 1-238713 A | | 9/1989 |
| JP | 2-279243 A | | 11/1990 |
| JP | 5-44726 A | | 2/1993 |
| JP | 07035146 A | * | 2/1995 |
| JP | 2002-242930 A | | 8/2002 |
| JP | 2004-176825 A | | 6/2004 |
| JP | 2005083500 A | * | 3/2005 |
| JP | 2005195072 A1 | * | 7/2005 |

* cited by examiner (A)

(B)

B-B SECTIONAL VIEW (C)

DETAILED VIEW OF C PART

MOTION GUIDE DEVICE, TABLE APPARATUS, AND DAMPING METHOD FOR MOTION GUIDE DEVICE

CROSS-REFERENCE TO RELATED APPLICATIONS

This application is a 371 of International Application PCT/JP2005/019981, which claims priority from JP 2004-331221 and JP 2005-315299.

TECHNICAL FIELD

The present invention relates to motion guide devices, such as linear guides, ball splines, and ball screws, in which there are a raceway member, a moving member and rolling members, such as balls and rollers, intervening between the raceway member and the moving member.

BACKGROUND ART

Like a table making a linear movement on a frame of a machine, rolling-guide type of motion guide devices have now been put to use, in which rolling elements, including balls or rollers, are arranged in a guide portion subjected to a liner movement, are used to provide a guide function with the aid of rolling motions of the rolling elements. This rolling-guide type of motion guide device is equipped with a raceway rail forming a track for motions of a moving member, a moving block moving relatively to the raceway rail, and rolling elements disposed to intervene between the raceway rail and the moving block.

Compared to sliding guide, the rolling guide has various advantages, such as extremely low friction resistance and being operated even in a condition there is no play at all by being pressurized. However, at the same time, the rolling guide cannot generate a damping force like friction resistance caused in the sliding guide, so that there is a disadvantage that vibration, once caused, is difficult to be damped. When a moving member is moved to a target position and then stopped thereat, the vibration will occur due to the inertia of the moving member and, even during movement of the moving member, the vibration may occur.

In order to damp the vibration caused by a motion guide device, the applicant has proposed a technique for damping vibration of a moving block by installing a dynamic damper, composed of a weight and rubber, to a moving block of the motion guide device so as to allow the dynamic damper to damp the vibration of the moving block (refer to claim 1 of patent reference 1).

As another conventional technique for damping the vibration, there has also been known a damping technique for a moving block, where a rubber-made contact seal which is able to contact a raceway rail to the moving block of a motion guide block so that the friction of the contact seal is utilized for damping the vibration.

Patent Reference 1: Japanese Patent Laid-open Publication No. 2004-176825.

DISCLOSURE OF INVENTION

Problems to be Solved by the Invention

However, the damping technique by attaching the dynamic damper to the moving block is confronted with a difficulty that the device is made larger in size. In addition, there is another difficulty that the weight and elastic member of the dynamic damper needs to be designed on vibration of the moving member. Hence it is difficult to adopt the dynamic damper as a universal damping device for motion guide devices.

Furthermore, in the damping technique that uses the contact seal attached to the moving block, there is a problem that friction resistance is caused largely when being activated (that is, the moving block begins to start). The larger friction resistance causes an excessive burden on a motor to move the moving block. Additionally, a long-term use may cause wear of the contact to the extent that there is no contact between the moving block and the contact seal. It is therefore difficult to damp the vibration of the moving block after a long-term use.

Therefore, it is an object of the present invention to solve the foregoing various difficulties and to provide a motion guide device having a novel damping structure which is different from the conventional one.

Means for Solving the Problem

The present invention will now be described below. In the followings, reference numerals appearing in the accompanying drawings are added in brackets for ease in understanding the present invention, but this is not intended that the present invention is limited to the structures shown in the drawings.

In order to achieve the above object, the invention according to claim 1 provides a motion guide device characterized by having: a raceway member (1) having a rolling-element rolling part (1*a*); a moving member (2) having a loaded rolling-element rolling part (2*a*) facing the rolling-element rolling part (1*a*) and being allowed to make a linear or curved movement relatively to the raceway member (1); a plurality of rolling elements (3) intervening between the rolling-element rolling part (1*a*) of the raceway member (1) and the loaded rolling-element rolling part (2*a*) of the moving part (2); and a layer of oil filled in a gap (16) between the raceway member (1) and the moving member (2) the moving member (2) having a moving block (4) on which the loaded rolling-element rolling part (2*a*) is formed, and an end damping member (5) which is separate from the moving block (4) and attached to an end face of the moving block (4) in a movement direction of the moving block (4), the layer of oil being filled in a gap between the end damping member (5) and the raceway member (1) and viscosity resistance of the oil being utilized to apply a braking force to the moving member (2) or the raceway member (1) in proportion to a speed.

Additionally, the end damping member (5) may have an oil supply passage (15) supplying the oil to the gap (16) and the oil flows out from the gap (16).

The motion guide device may also be characterized in that the damping member (5) has a surface to which the layer of oil is contacted, the surface being formed to be concavo-convex.

The motion guide device may also be characterized in that the damping member (5) includes an end damping member (5) attached to an end face of the moving member (2), the end face being located in a movement direction of the moving member, the end damping member (5) has a plurality of first thin plates (9) and a plurality of second thin plates (10), the first and second plates being laminated on one another alternately between the first and second plates, the first plates (9) and the second plates (10) have an opening (9*a*, 10*a*) formed therein to be consistent in shape with the raceway member (1), and a gap (β) between the second plates (10) and the raceway member (1) is larger than a gap (α) between the first plates (9) and the raceway member (1) so that the end damping member (5) has a surface contacted by the layer of oil and shaped to become the concavo-convex surface in a condition where the first plates (9) and the second plates (10) are laminated.

motion guide device may also be characterized in that the second plates (10) have a slit (10c) formed therein for supplying oil to the gap (16) between the end damping member (5) and the raceway member (1), and the first plates (9) and the second plates (10) have an oil supply hole (9b, 10b) formed therein for supplying the oil to the slit (9c) formed in the second plates (9) in the condition where the first plates (9) and the second plates (10) are laminated.

The motion guide device may have: a raceway member (1) having a rolling-element rolling part (1a); a moving member (2) having a loaded rolling-element rolling part (2a) facing the rolling-element rolling part (1a) and being allowed to make a linear or curved movement relatively to the raceway member (1); a plurality of rolling elements intervening between the rolling-element rolling part (1a) of the raceway member (1) and the loaded rolling-element rolling part (2a) of the moving member (2); and a layer of oil filled in a gap (19) between the raceway member (1) and the moving member (2) such that the layer of oil contacts the raceway member (1) and the moving member (2), the moving member (2) having a moving block (4) on which the loaded rolling-element rolling part (2a) is formed, and a side damping member (6, 21, 24, 26) which is separate from the moving block (4) and attached to the moving block (4), the moving block (4) having a central part (4a) facing an upper surface of the raceway member (1) and a stem part (4b) facing a side surface of the raceway member (1), the moving block (4) being formed into a saddle shape as a whole, the side damping member (6, 21, 24, 26) being attached to the stem part (4b) of the moving block (4), the layer of oil being filled in a gap (19) between the side damping member (6, 21, 24, 26) and the raceway member (1), and viscosity resistance of the oil being utilized to apply a braking force to the moving member (2) or the raceway member (1) in proportion to a speed.

The motion guide device may also be characterized in that the side damping member (21) has a plurality of grooves (23) each extending a direction intersecting a movement direction of the moving member (2).

The motion guide device may also be characterized in that the side damping member (24) has a plurality of grooves (29) each extending along a movement direction of the moving member (2).

The table apparatus may comprise: a motion guide device having a raceway member (1) having a rolling-element rolling part (1a), a moving block member (2) having a loaded rolling-element rolling part (2a) facing the rolling-element rolling part (1a) and being allowed to make a linear or curved movement relatively to the raceway member (1), and a plurality of rolling elements (3) intervening between the rolling-element rolling part (1a) of the raceway member (1) and the loaded rolling-element rolling part (2a) of the moving part member (2); and a layer of oil filled in a gap (16) between the raceway member (1) and the moving member (2) such that the layer of oil contacts the raceway member (1) and the moving member (2); and a table (31) attached to the moving member (2) including a moving block (4) on which the loaded rolling-element rolling part (2a) is formed, and an end damping member (5) which is separate from the moving block (4) and attached to an end face of the moving block (4) in a movement direction of the moving block (4), the layer of oil being filled in a gap (16) between the end damping member (5) and the raceway member (1), and viscosity resistance of the oil being utilized to apply a braking force to the table (31) in proportion to a speed.

The damping method for a motion guide device may comprise: a raceway member (1) having a rolling-element rolling part (1a), a moving block (2) having a loaded rolling-element rolling part (2a) facing the rolling-element rolling part (1a) and being allowed to make a linear or curved movement relatively to the raceway member (1), and a plurality of rolling elements (3) intervening between the rolling-element rolling part (1a) of the raceway member (1) and the loaded rolling-element rolling part (2a) of the moving part (2), the moving member (2) having a moving block (4) on which the loaded rolling-element rolling part (2a) is formed, and an end damping member (5) which is separate from the moving block (4) and attached to an end face of the moving block (4) in a movement direction of the moving block (4), and the damping method comprising: filling a layer of oil into a gap (16) between the end damping member (5) and the raceway member (1) such that the layer of oil contacts the end damping member (5) and the raceway member (1); and utilizing viscosity resistance of the oil is utilized to apply a braking force to the moving member (2) or the raceway member (1) in proportion to a speed.

The invention according to claim 12 provides a table apparatus comprising: a motion guide device having a raceway member (1) having a rolling-element rolling part (1a), a moving member (2) having a loaded rolling-element rolling part (2a) facing the rolling-element rolling part (1a) and being allowed to make a linear or curved movement relatively to the raceway member (1), and a plurality of rolling elements (3) intervening between the rolling-element rolling part (1a) of the raceway member (1) and the loaded rolling-element rolling part (2a) of the moving member (2) and a layer of oil filled in a gap (16) between the raceway member (1) and the moving member (2) such that the layer of oil contacts the raceway member (1) and the moving member (2); and a table (31) attached to the moving member (2) of the motion guide device, the moving member (2) having a moving block (4) on which the loaded rolling-element rolling part (2a) is formed, and a side damping member (6, 21, 24, 26) which is separate from the moving block (4) and attached to the moving block (4), the moving block (4) having a central part (4a) facing an upper surface of the raceway member (1) and a stem part (4b) facing a side surface of the raceway member (1), the moving block (4) being formed into a saddle shape as a whole, the side damping member (6, 21, 24, 26) being attached to the stem part (4b) of the moving block (4), the layer of oil being filled in a gap (19) between the side damping member (6, 21, 24, 26) and the raceway member (1), and viscosity resistance of the oil being utilized to apply a braking force to the table (31) in proportion to a speed.

The invention according to claim 13 provides a damping method for a motion guide device comprising a raceway member (1) having a rolling-element rolling part (1a), a moving member (2) having a loaded rolling-element rolling part (2a) facing the rolling-element rolling part (1a) and being allowed to make a linear or curved movement relatively to the raceway member (1), and a plurality of rolling elements (3) intervening between the rolling-element rolling part (1a) of the raceway member (1) and the loaded rolling-element rolling part (2a) of the moving member (2), the moving member (2) having a moving block (4) on which the loaded rolling-element rolling part (2a) is formed, and a side damping member (6, 21, 24, 26) which is separate from the moving block (4) and attached to the moving block (4), the moving block (4) having a central part (4a) facing an upper surface of the raceway member (1) and a stem part (4b) facing a side surface of the raceway member (1), the moving block (4) being formed into a saddle shape as a whole, the side damping member (6, 21, 24, 26) being attached to the stem part (4b) of the moving block (4), the damping method comprising: filling a layer of oil being filled in a gap (19) between the side damping member (6, 21, 24, 26) and the raceway member (1) such that the layer of oil contacts the side damping member (6, 21, 24, 26) and the raceway member (1); and utilizing viscosity resistance of the oil to apply a braking force to the moving member (2) or the raceway member (1) in proportion to a speed.

Advantageous Effects of the Invention

The viscosity resistance of the layer of the oil filled in the gap between the raceway member and the moving member gives the motion guide device a damping characteristic. Since the braking power is in proportion to the movement speed of the moving member, the braking power caused when the device starts remains to be smaller, while the braking power becomes higher with an increase in the movement speed of the moving member. Accordingly, for moving the moving member with the help of a motor, for instance, the braking force can be reduced so that a load applied to the motor is reduced. Meanwhile when the moving member stops and is about to vibrate, the braking force can be made larger to suppress and damp the vibration smoothly. In addition, so long as the oil is kept being supplied to the motion guide device, the device can be used semi-permanently as a device with the damping function. Hence it is avoidable that the disadvantage that damping the vibration is weakened as the time goes by, which is seen in contact seals. Further, as the end damping member is provided as a member separate from the moving block, it is easier to make the gap between the end damping member and the raceway member smaller. Because the viscosity resistance of the oil becomes larger as the oil layer is thinner, a larger braking force can be obtained by making the gap between the end damping member and the raceway member smaller.

In a motion guide device in which a moving member makes linear or curbed movements along a raceway member, it is difficult to seal oil filled in a gap between the end damping member and the raceway member, compared to the sealing in rotary bearings. Further, the oil supply passage may be formed for supplying oil to the gap between the end damping member and the raceway member, whereby the oil can be filled into the gap even when the oil flows out of the gap.

Further, the concavo-convex shape of the surface of the end damping member gives the oil sticking to the end damping member. Hence the end damping member has an improved performance for retaining the oil, thereby reducing the amount of oil flowing out of the gap. By contrast, if the surface of the end damping member which contacts the layer of oil is made flat, there is no means for giving sticking to the end damping member, the oil retaining performance of the end damping member is lessened.

Still further, it is possible to provide the end damping member with a concavo-convex surface to contact the layer of oil. In addition, when the end damping member is moved relatively to the raceway member, the oil can be retained by the end damping member.

Further, the oil can be filled into the gap between the end damping member and the raceway member. Further, the slit is formed in the second plates with the gap from the raceway member is larger, so that it is easier to fill the oil into the gap between the end damping member and the raceway member. Still further, the slit is formed every two plates, which allows the oil to be filled in the entire gap with ease. And, compared to the structure in which the slit is formed in both the first and second plates, the amount of oil can be suppressed, with the oil still supplied at an appropriate amount.

Additionally, the layer of oil may be located between the side damping member and the raceway member. As the side damping member is provided as a member separate from the moving block, it is easier to make the gap between the side damping member and the raceway member smaller. Because the viscosity resistance of the oil becomes larger as the oil layer is thinner, a larger braking force can be obtained by making the gap between the side damping member and the raceway member smaller.

The grooves may be formed on the side damping member to extend in the direction intersecting the movement directions of the moving member. Therefore, when the side damping member is moved relatively to the moving member, the oil can still be retained by the side damping member.

The grooves may also be formed on the side damping member to extend in the movement directions of the moving member. This prevents the oil form flowing out of the side damping member in the direction (for example, downward direction) intersecting the movement directions of the moving member.

The viscosity resistance of the layer of the oil filled in the gap between the raceway member and the moving member gives the table a damping characteristic. Since the braking power is in proportion to the movement speed of the moving member, the braking power caused when the device starts remains to be smaller, while the braking power becomes higher with an increase in the movement speed of the table. Accordingly, for moving the table with the help of a motor, for instance, the braking force can be reduced so that a load applied to the motor is reduced. Meanwhile when the table stops and is about to vibrate, the braking force can be made larger to suppress and damp the vibration smoothly. In addition, so long as the oil is kept being supplied to the motion guide device, the device can be used semi-permanently as a device with the damping function. Hence it is avoidable that the disadvantage that damping the vibration is weakened as the time goes by, which is seen in contact seals. Further, as the end damping member is provided as a member separate from the moving block, it is easier to make the gap between the end damping member and the raceway member smaller. Because the viscosity resistance of the oil becomes larger as the oil layer is thinner, a larger braking force can be obtained by making the gap between the end damping member and the raceway member smaller.

There is also provided a damping method configured for a motion guide device.

The viscosity resistance of the layer of the oil filled in the gap between the raceway member and the moving member gives the table a damping characteristic. In addition, as the side damping member is provided as a member separate from the moving block, it is easier to make the gap between the side damping member and the raceway member smaller. Because the viscosity resistance of the oil becomes larger as the oil layer is thinner, a larger braking force can be obtained by making the gap between the side damping member and the raceway member smaller.

There is also provided a damping method configured for a motion guide device.

Figure 1:
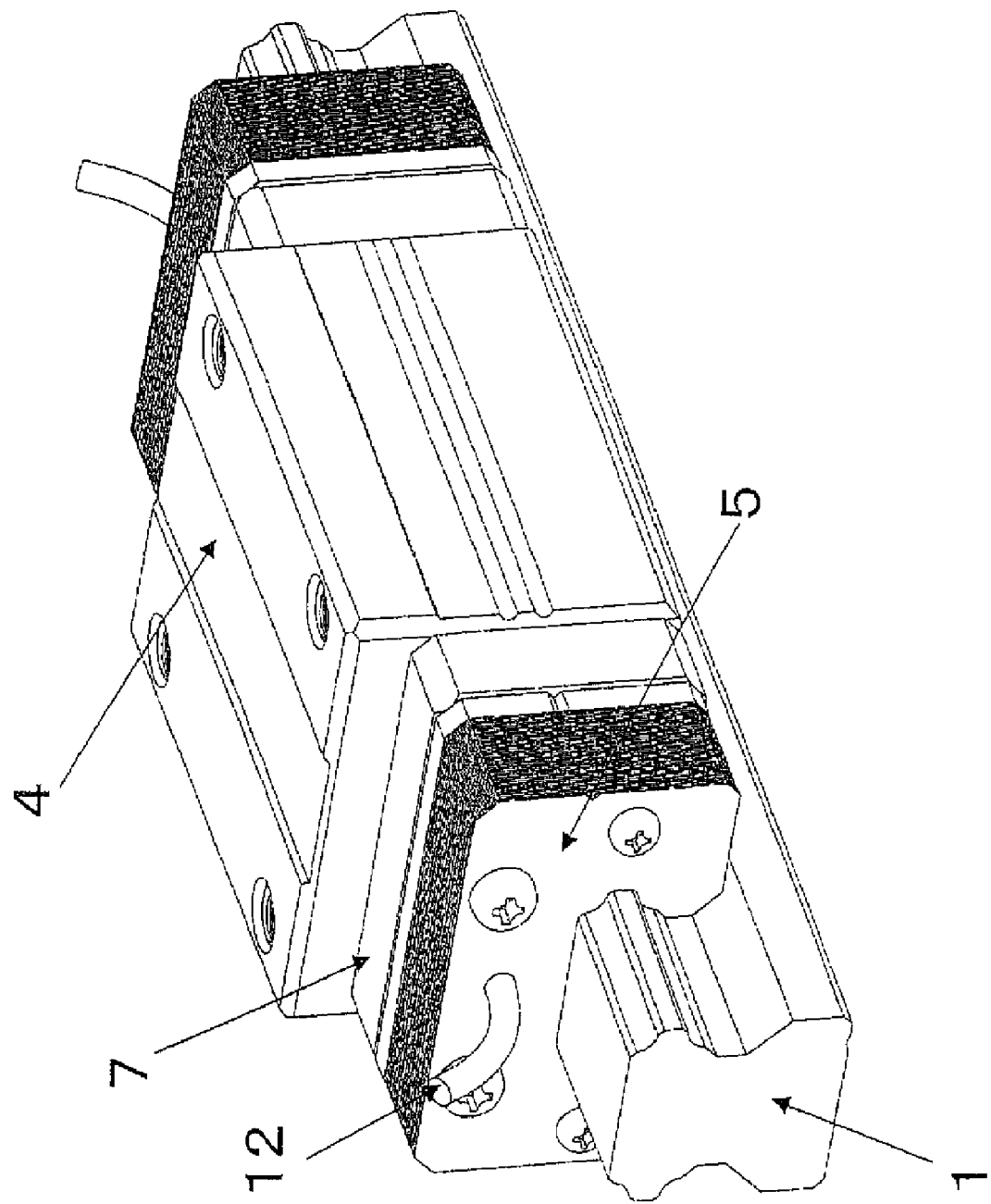
FIG. 1 is a perspective view showing a motion guide device according to an embodiment of the present invention.

BRIEF DESCRIPTION OF REFERENCES 1 raceway rail (raceway member)
1a ball rolling groove (rolling-element rolling groove)
2 moving member
2a loaded ball rolling groove (loaded rolling-element rolling groove)
3 ball (rolling element)
4 moving block
4a central part
4b stem part
5 end damping member (damping element)
6, 21, 24, 26 side damping member (damping element)
9 first plate
9a, 10a opening
9b, 10b oil supply hole (oil supply passage)
10 second plate
10c slit (oil supply passage)
15 oil supply passage
16, 19 gap
23, 26, 29 groove
31 table
32 damping member

BEST MODE FOR CARRYING OUT THE INVENTION

Figure 2:
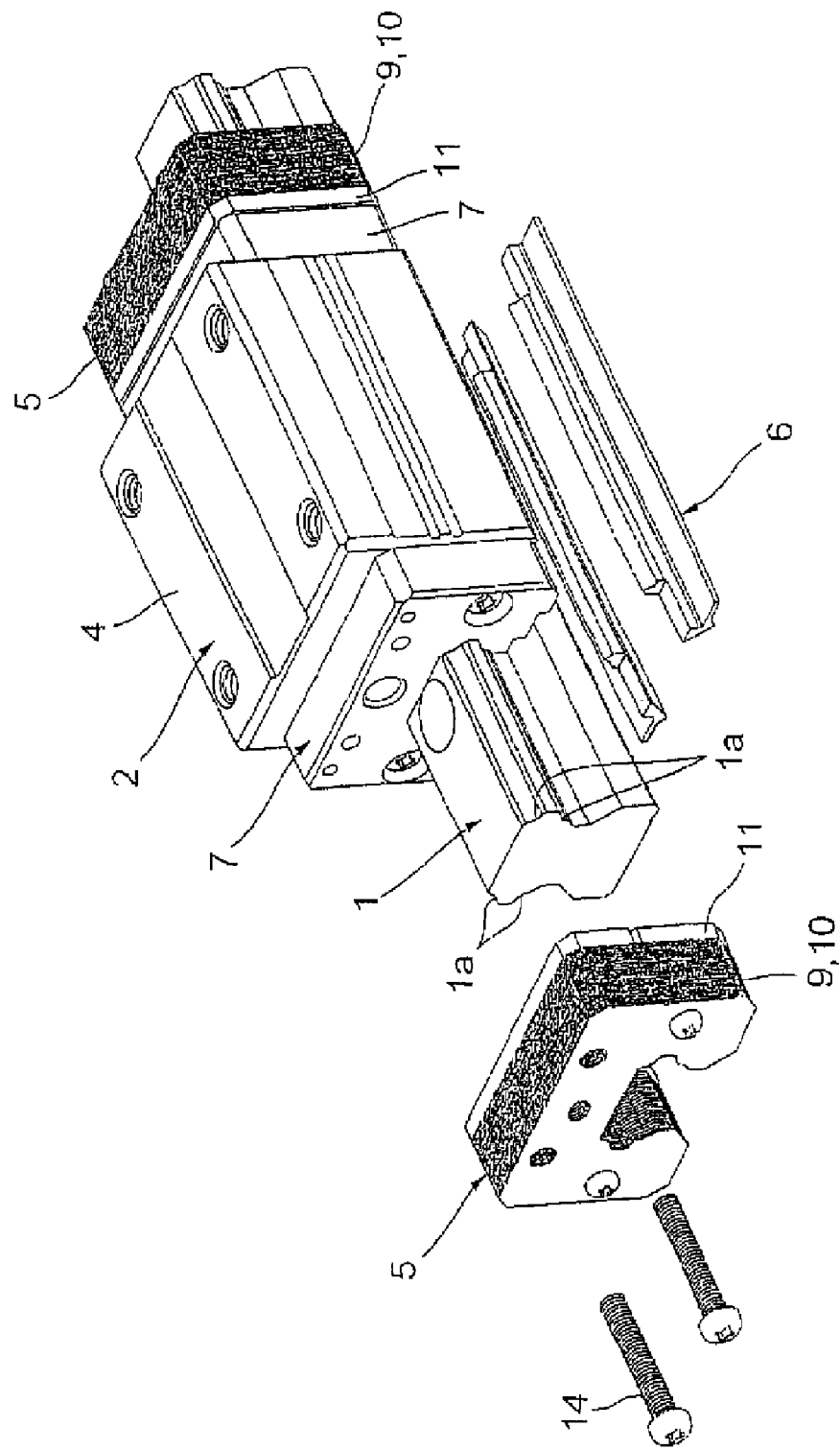
FIG. 2 is a disassembled perspective view showing the motion guide device.
Figure 3:
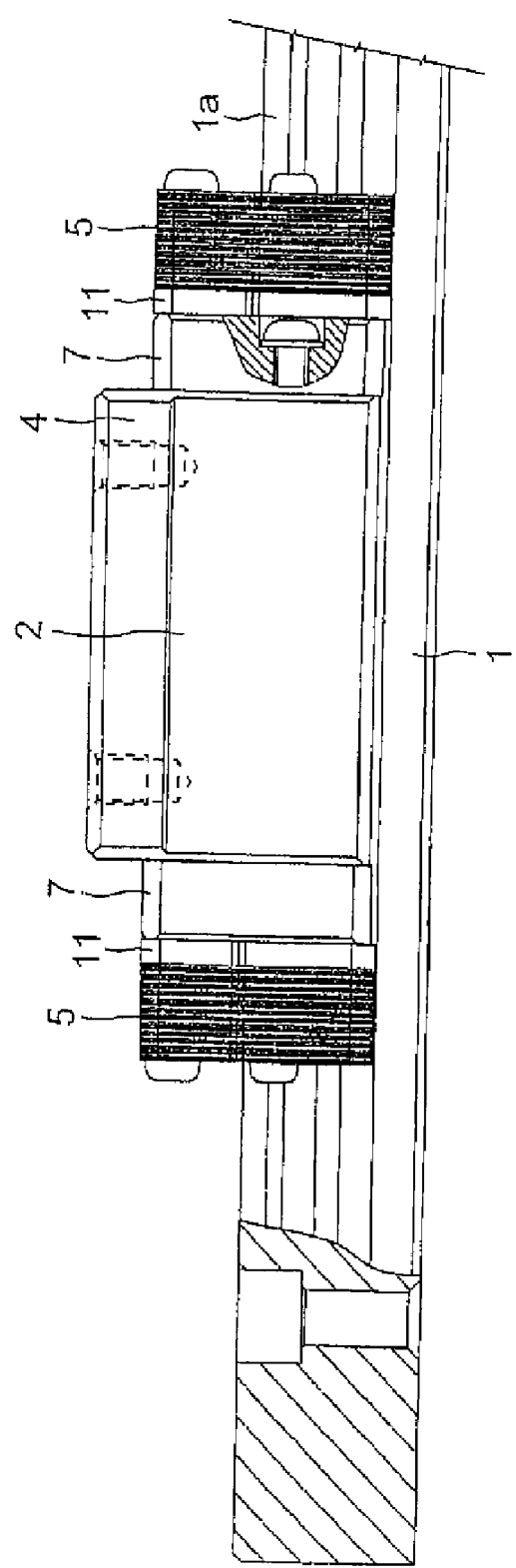
FIG. 3 is a side view showing the motion guide device.
Figure 4:
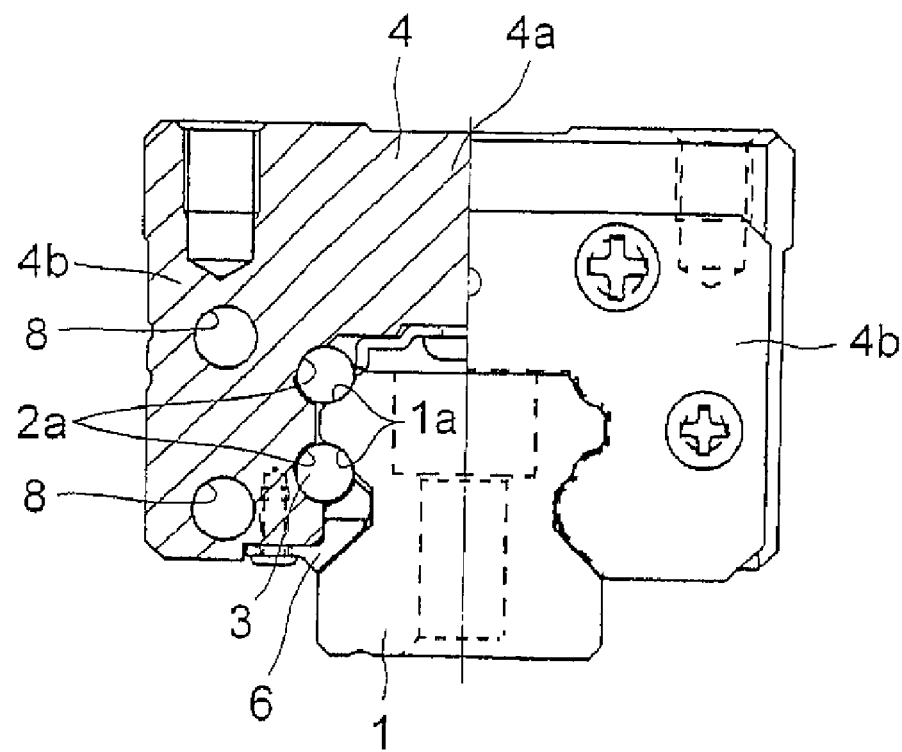
FIG. 4 is a side view showing the motion guide device (with a view partially sectioned)

FIGS. 1-4 show a motion guide device according to an embodiment of the present invention. Of these, FIG. 1 is a perspective view showing the motion guide device, FIG. 2 is a disassembled perspective view showing the motion guide device, FIG. 3 is a side view, and FIG. 4 is a frontal view (with a view partially sectioned). The motion guide device according to the present embodiment is called a liner guide and is provided with a raceway rail 1 extending linearly and serving as a raceway member, and a moving member 2 movably assembled with the raceway rail 1 with a large number of balls 3 serving as rolling elements therebetween.

On both right and left side surfaces of the raceway rail 1, there are formed ball rolling grooves 1a, serving as rolling-element rolling portion, extending in a longitudinal direction thereof. Each ball rolling groove 1a has an arch-shaped section of which curvature is slightly larger than the diameter of each ball 3. In the present embodiment, on each of the right and left side surfaces of the raceway rail 1, two grooves are formed at upper and lower positions thereof, so that four ball rolling grooves 1a are formed in total. Of course, the number of grooves and arrangements of the grooves can be set in various ways depending on factors such as weight to be loaded.

The moving member 2 is composed of a moving block 4 on which a ball circulation passage including a loaded ball rolling groove 2a facing a ball rolling groove 1a and damping members 5 and 6 attached to the moving block 4.

As shown in FIG. 4, the moving block 4 is formed to have a saddle shape as a whole and has a central part 4a facing an upper surface of the raceway rail 1 and stem parts 4b respectively extending downward from the right and left both sides of the central part 4a and facing side surfaces of the raceway rail 1.

Between the ball rolling grooves 1a of the raceway rail 1 and the loaded ball rolling grooves 2a of the moving block 4, the plurality of balls 3 are present for intervention therebetween. The balls 3, which roll along a loaded ball rolling passage formed between each ball rolling groove 1a and each loaded ball rolling groove 2a, is pressurized therebetween. The balls 3 make a rolling movement along the loaded ball rolling passage with being weighed. On both ends of the moving block 4 in the movement directions thereof, there are attached end plates 7 (refer to FIGS. 1 and 2) in which U-shaped direction changing passages are formed, respectively. The balls 3 which have rolled and reached one end of the loaded ball rolling passage of the moving block 4 enters the U-shaped direction changing passage formed in each end plate 7 (refer to FIGS. 1 and 2). After circulating the U-shaped direction changing passage, the balls enter a non-loaded ball return passage 8 (refer to FIG. 4) which extends in parallel to the loaded ball rolling passage. The balls 3, which have passed the non-loaded ball return passage 8, circulate the direction changing passage of the opposite-side end plate 7, and again enter the loaded ball rolling passage. A ball circulation passage is composed in a circuit form by a combination of the liner loaded ball rolling passage, the U-shaped direction changing passages, and the liner non-loaded ball return passage 8.

As shown in FIGS. 1 and 2, to both end faces of the moving block 4 in the movement directions thereof, end damping members 5 are attached, respectively, which serve as damping members. Each end damping member 5 is composed of a plurality of first thin plates 9 and a plurality of second thin plates 10, which are laminated on one another alternately between the first and second plates, and a holding plate 11 to which each of the first and second plates 9 and 10 is attached. The end damping member 5 has an opening of which contour is in accord with the outer shape of the raceway rail 1. With no contact with the raceway rail 1, the end damping members 5 make a gap between the raceway rail 1 and the moving block 4 as small as possible.

Figure 5:
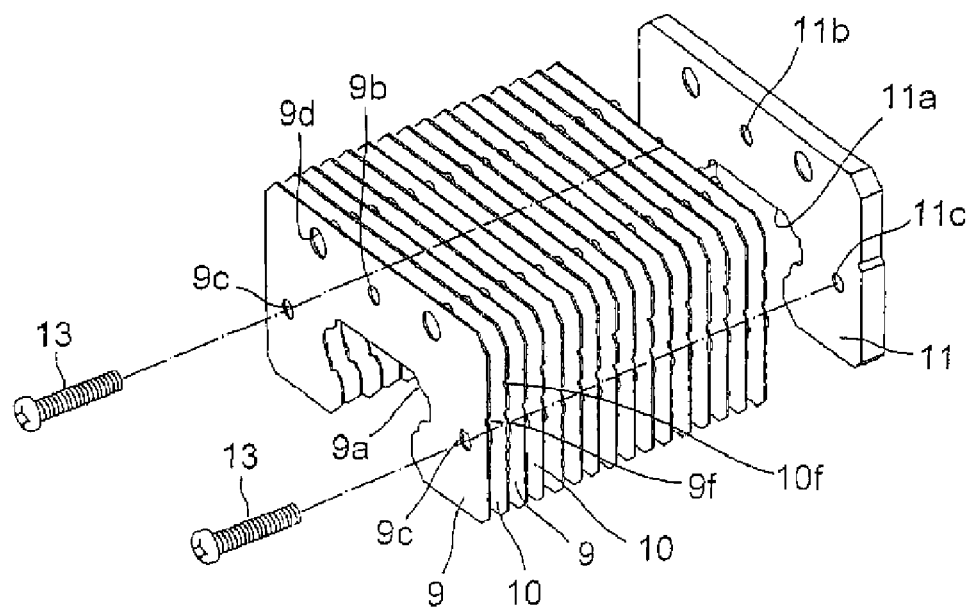
FIG. 5 is a disassembled perspective view of end damping members.
Figure 6:
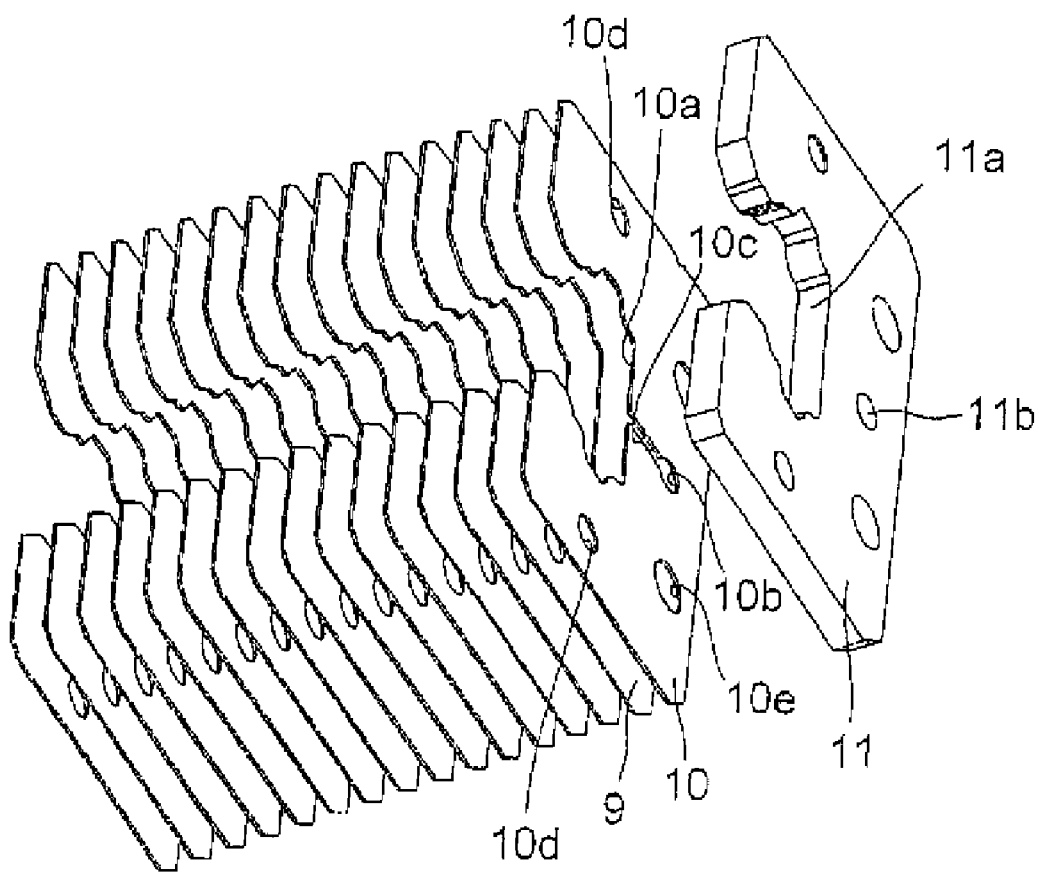
FIG. 6 is a view showing a state in which the end damping members shown in FIG. 5 is flipped.

FIGS. 5 and 6 show a disassembled perspective view of each end damping member 5. Of these, FIG. 5 shows a disassembled perspective view of a combination of the first plates 9, the second plates 10, and the holding plate 11, while FIG. 6 is a disassembled perspective view obtained by flipping the end damping member 5 shown in FIG. 5. The first plates 9 are manufactured by stamping a thin metal plate such as stainless steel. Each of the first plates 9 is shaped into an approximately rectangular form and has a central part on a one side thereof, where the central part is formed to have an opening 9a of which shape is consistent with the contour of sections of the raceway rail 1. Though detailed later, the shape of the opening 9a is slightly larger than the sectional contour of the raceway rail 1. An oil supply hole 9b for supplying oil to a gap between each end damping member 5 and the raceway rail 1 is formed at a position of each of the first plates 9, the position being oppositely shifted from the opening 9a. At positions on both sides of each of the first plates 9 which positionally neighbor the opening 9a, through-holes 9c are formed therethrough which allow screws 13 or other elements to pass through for attaching both the first and second plates 9 and 10 to the holding plate 11. Further, at both positions laterally neighboring the oil supply hole 9b of each of the first plates, through-holes 9d are formed therethrough which allow screws 14 (refer to FIG. 2) or other elements to pass through for attaching each end damping member 5 to the moving block 4. A triangular notch 9f is formed on the surface of a side of each of the first plates 9.

Each of the second plates 10 is also formed into an approximately rectangular form and has a central part on a one side thereof, where the central part is formed to have an opening 10a of which shape is consistent with the contour of sections of the raceway rail 1. Though detailed later, the openings 10a of the second plates 10 are slightly larger in contours than the openings 9a of the first plates 9. Accordingly, laminating the first and second plates 9 and 10 alternately one on another creates a concavo-convex shape along part of the opening portion. This concavo-convex shape consists of concavo rows and convex rows and those concavo and convex rows extend in a direction intersecting movement directions of the moving block (in the present embodiment, those concavo and convex parts extend in a direction perpendicular to the movement directions).

An oil supply hole 10b for supplying oil to a gap between each end damping member 5 and the raceway rail 1 is formed at a position of each of the second plates 10, the position being oppositely shifted from the opening 10a. In addition, in each of the second plates 10, a slit 10c is formed to extend from the oil supply hole 10b to the opening 10a. This slit 10c functions as a passage through which the oil is supplied to the gap between the end damping member 5 and the raceway rail 1. Moreover, at both positions laterally neighboring the opening 10a in each of the second plates 10, through-holes 10d are also formed therethrough which allow the screw 13 or other elements to pass through. The second plates are also manufactured by stamping, for example, a thin metal plate. On the surface of a side of each of the second plates 10, a triangular notch 10f is formed so as to be shifted from that of each of the first plates 9 in the longitudinal direction. This is for drawing the line between the first and second plates 9 and 10 from its external appearance after assembling. Instead of using the stamping technique to produce the first and second plates 9 and 10, laser beam machining or wire electric discharge machining can be used for the production, whereby the first and second plates 9 and 10 are improved in their dimensional accuracy.

In order that each of the end damping members 5 has a number of concavo-convex shapes, it is desirable that the first and second plates 9 and 10 are made thinner. In contrast, when considering preventing deformations due to tightening the plates with screws, it is preferred that the first and second plates 9 and 10 have a certain degree of thickness. In light of these mutually conflicting needs, the first and second plates 9 and 10 are produced to have a thickness of 0.2 mm or thereabouts, for instance. Of course, various thickness amounts other than the above may be available depending on factors including the size of the moving block 4.

The holding plate 11 is made thicker than the first and second plates 9 and 10. This holding plate 11 has also an opening 11a which is consistent in shape with the raceway rail 1. At a position facing, but shifted to an end from the opening 11a in the holding plate 11, a oil circulation hole 11b communicating with the oil supply holes 9b and 10b is formed therethrough. At positions neighboring to the opening 11a in the holding plate 11, female screw portions 11c are formed to be engageable with the screws 13. An assembling jig is used such that the first and second plates 9 and 10 and the holding plate 11 are pushed to this assembling jig for positioning, and the screws 13 are applied to combine those plates.

Figure 7:
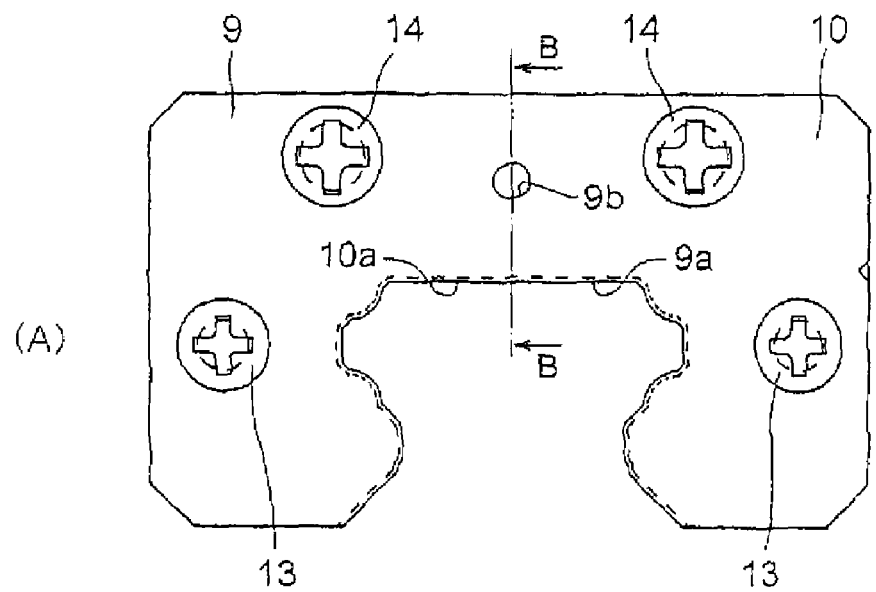
FIG. 7 is a view showing the end damping members which are laminated (in this view, (A) shows the frontal view, (B) shows a sectional view taken along a B-B line, and (C) shows a detailed view)
Figure 7:
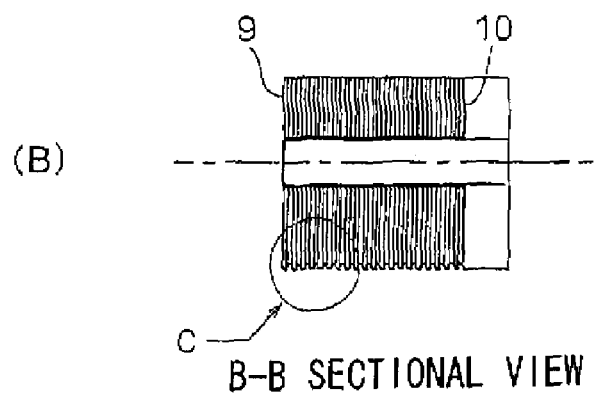
Figure 7:
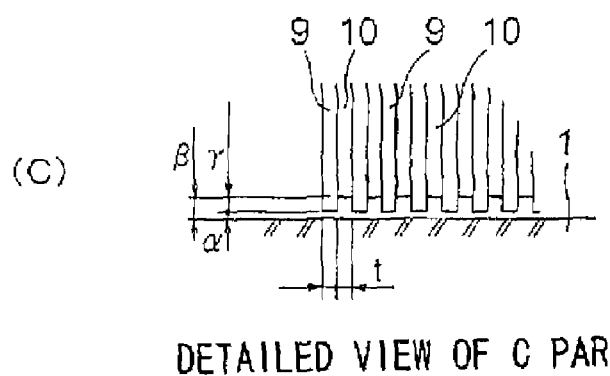

FIG. 7 shows each end damping member which is laminated. As shown in FIG. 7(A), the second plates 10 have the openings 10a slightly larger in contour size than the openings 9a of the first plates 9. Hence, as shown in FIGS. 7(B) and (C), with the first and second plates 9 and 10 laminated alternately one on another, a gap β between the second plates 10 and the raceway rail 1 is greater than a gap α between the first plates 9 and the raceway rail 1, whereby as described before, there are formed a concave-convex gap by the mutually faced surfaces between the plates 9, 10 and the raceway rail 1.

In a state where each damping member 5 is attached to the moving block 4, the gap α between a portion of the first plates 9 which is the closest to the raceway rail 1 and the raceway rail 1 is set to 0.25 mm or less. For example, the gap is set to some 0.05 to 0.25 mm. The smaller this gap α, the larger the viscosity resistance, as will described later, so that it is preferred that a target value to the gap α is set to some 0.05 to 0.06 mm or less than it. However, since the raceway rail 1 involves a tolerance in its processing, setting the gap to a too small amount may cause a contact between the end damping members 5 and the raceway rail 1. Thus, in the present embodiment, in consideration of a tolerance ±0.1 mm of the raceway rail 1, a tolerance ±0.05 mm of the end damping members 5, and an variation 0.02 to 0.03 mm of the gap α due to loads applied to the motion guide device, the gap α is set to some 0.02 to 0.25 mm, preferably to some 0.05 to 0.15 mm.

In the present embodiment, a difference γ in height (step) between the first plates 9 and the second plates 10 is approximately equal to the thicknesses of the first and second plates 9 and 10, and for example set to some 0.2 mm. The larger the difference γ between the heights, the larger a contact area made between the oil and each end damping member 5. However, larger contact areas will cause the gap β between the second plates 10 and the raceway rail 1 to be larger, thus making the viscosity resistance smaller. Hence the difference γ between the heights should be decided depending on those mutually conflicting factors. Of course this difference will not be limited to 0.2 mm.

Figure 8:
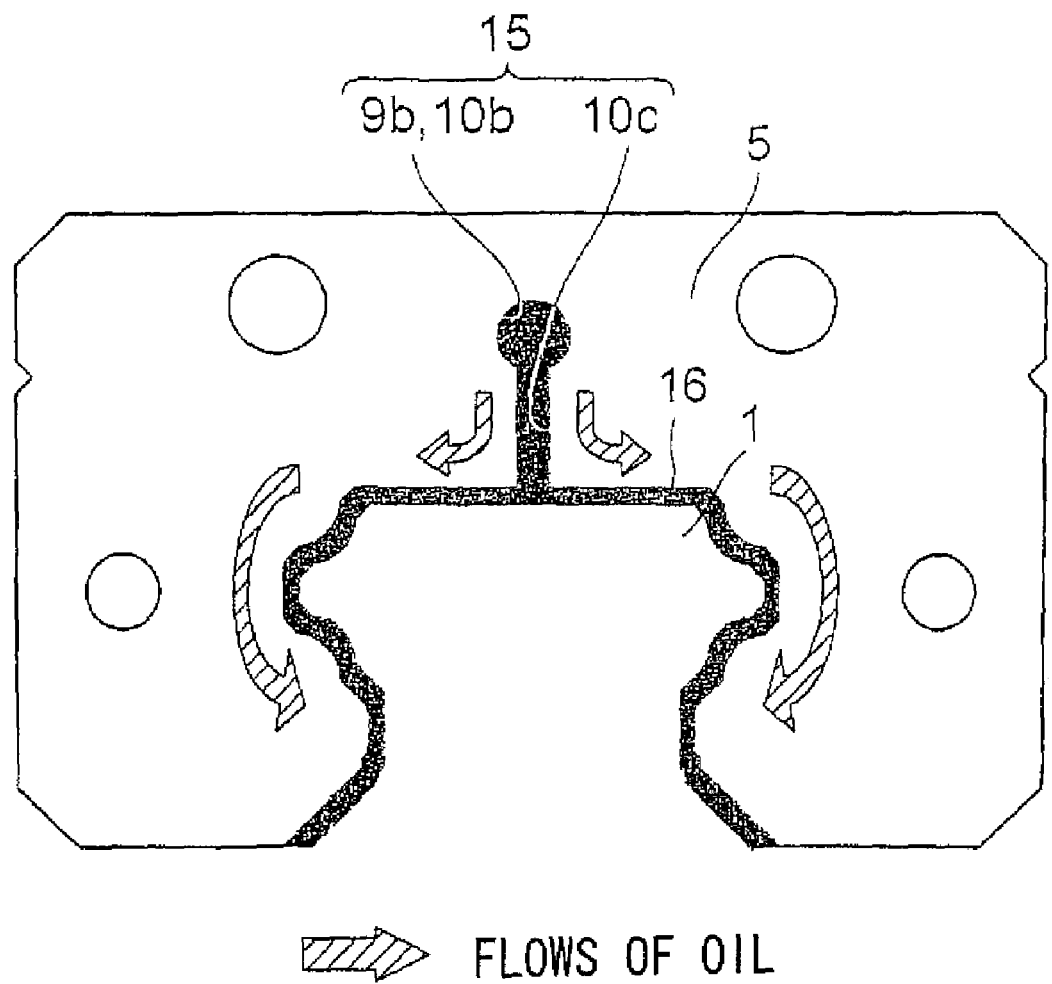
FIG. 8 is a view showing flows of oil in the end damping members (a frontal view)
Figure 9:
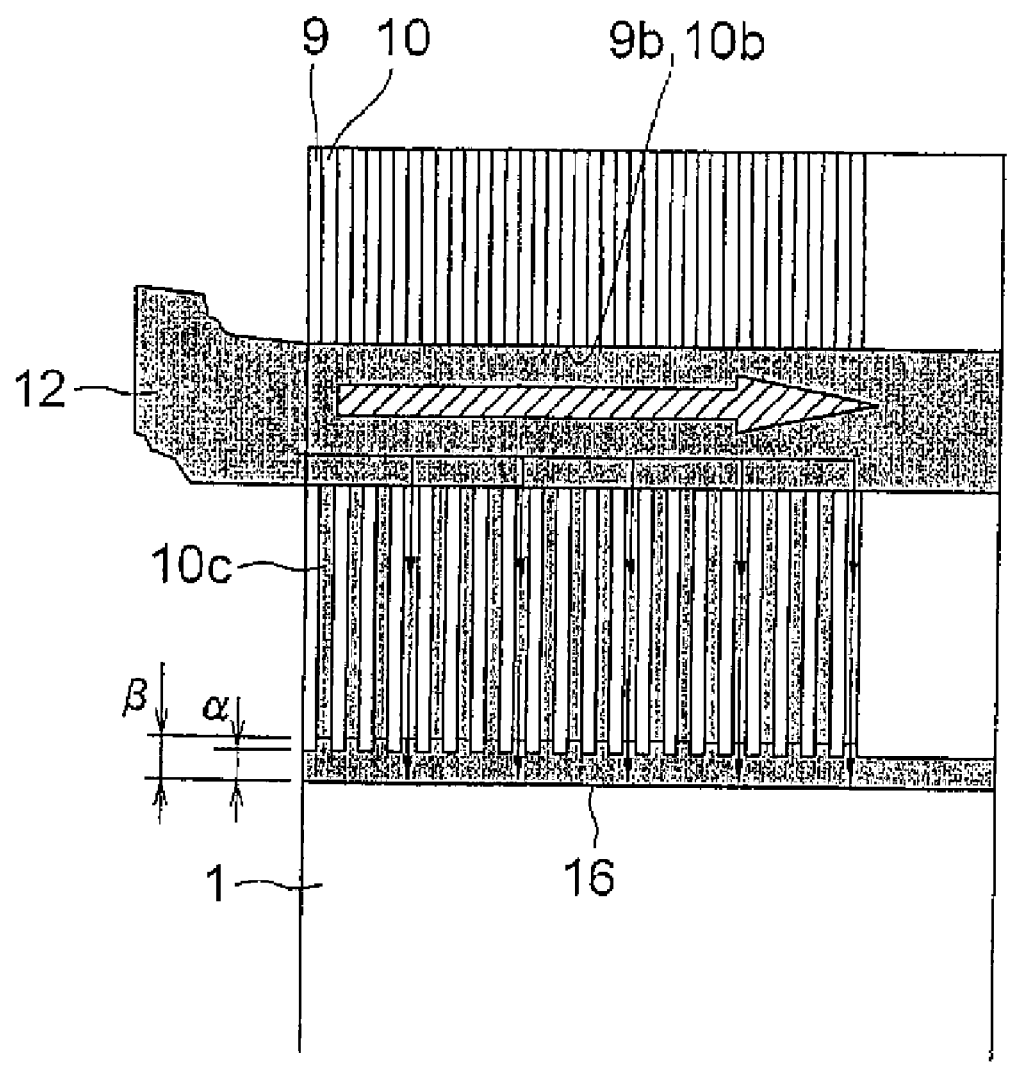
FIG. 9 is a view showing a flow of oil in the end damping members (a sectional view)

FIGS. 8 and 9 show flows of the oil in each of the end damping members 5. The oil supply holes 9b and 10b of the first and second plates 9 and 10 and the slits 10c of the second plates 10 compose an oil supply passage 15. By supplying the oil to this oil supply passage 15 via the pipe 12 (refer to FIG. 1), the oil drops from the oil supply holes 9b and 10b and flows into a gap 16 formed between each end damping members 5 and the raceway rail 1 via the slits 10c of the second plates 10. In this way, arranging the oil supply passage 15 allows the gap 16 between each end damping members 5 and the raceway rail 1 to be filled with the oil all the time.

As shown in FIG. 9, the gap 0 between the second plates 10 and the raceway rail 1 is larger than the gap α between the first plates 9 and the raceway rail 1. Hence the oil is easier to flow into the gap between the second plates 10 and the raceway rail 1, whereby the oil can readily be filled in the gaps 16 between the end damping members 5 and the raceway rail 1. Further, the slits 10c are located every two plates, the oil is easier to spread over the gaps 16, and in comparison with the case where the slits 10c are formed every plate, the amount of oil being supplied can be reduced to have the oil supplied at its appropriate amount.

The end damping members 5 attached to the moving block 4 move without coming into contact with the raceway rail 1. The gap 16 between the inner side of each damping member 5 and the raceway rail 1 is filled with the layer of oil. When the moving member 2 moves relatively to the raceway rail 1, the resistance of viscosity of the oil is caused which results in a braking force. Thus the viscosity resistance of the oil damps vibration caused at the moving member 2. The viscosity resistance of the oil is in proportion of the moving speed of the moving member 2, with the result that the viscosity resistance caused when the moving member begins moving remains to be smaller, but becomes higher with increasing the moving speed of the moving member 2. Accordingly, for example, when a motor is used to make the moving member 2 move, a load to the motor can be reduced thanks to a smaller viscosity resistance. Meanwhile when the moving member 2 is about to vibrate after its stop, the vibration is suppressed and damped quickly thanks to a larger viscosity resistance.

The gaps 16 between the respective end damping members 5 and the raceway rail 1 is formed to have the highly thin thickness and to the concavo-convex contact surface to the oil, the oil is difficult to flow out of the gaps 16. Besides it, using an oil having a higher kinetic viscosity for gaining a higher viscosity resistance makes it further difficult that the oil flows out of the gaps 16. However, being not sealed completely, the oil flows out of the gaps 16 at least little by little.

The oil supplied to the gaps 16 is also applied to the raceway rail 1. Thus a system supplying the gaps 16 with the oil resembles a compulsory oil-supply system compulsorily supplying lubricant to the raceway rail 1. When the lubricant such as grease is thus commonly used as the oil being supplied to the gaps 16, it is not necessary that the moving member 2 contains other lubricants therein. For example, using lubricant whose kinetic viscosity is as high as 10 to 500 provides a higher viscosity resistance.

The moving block 4 may have oil passages to be linked with the oil supply passages of the end damping members 5 and the oil passages may have loop-like connections with the pipe 12 (refer to FIG. 1) attached to the oil supply holes 9b and 10b of the end damping members 5 so that oil can be circulated through the loop passage. The circulation of the oil enables heat accumulated in the moving block 4 to escape outside through heat exchange thus providing a cooling effect. Even in this case, the oil flows outside of the gaps 16 in dribs. The oil flowed out of the gaps 16 may be collected or may not be collected. In such a case where the oil is given the function of coolant, it is necessary to additionally arrange a seal to prevent the coolant from coming in the moving block 4.

Figure 10:
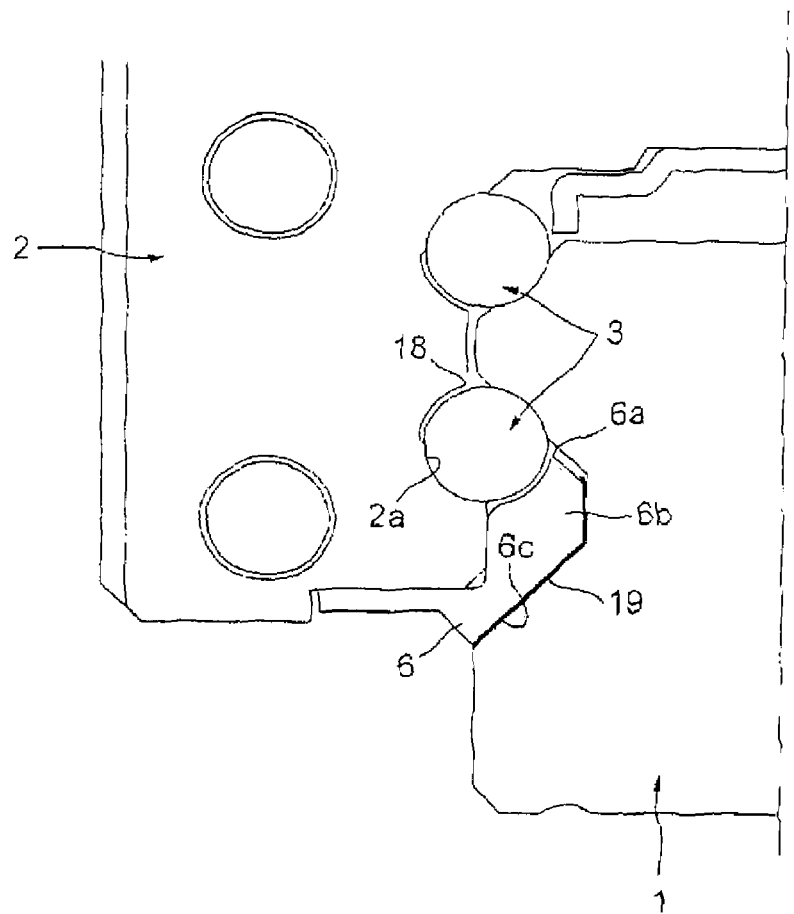
FIG. 10 is a frontal view showing side damping members attached to a moving block.
Figure 11:
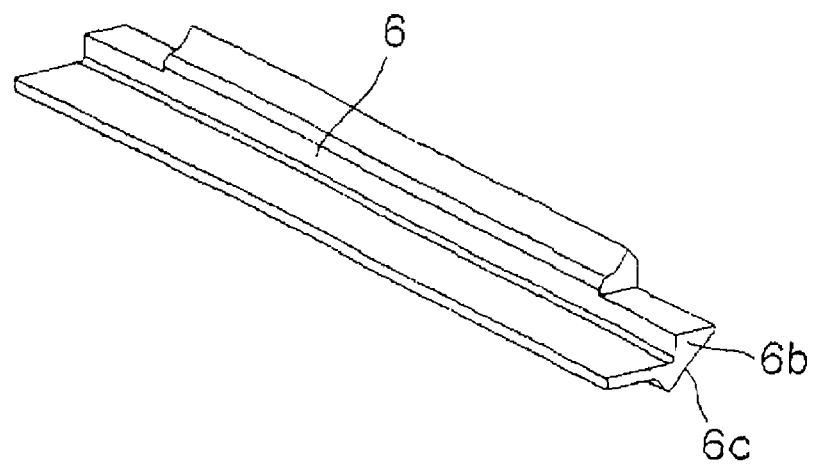
FIG. 11 is a perspective view showing the side damping members.

FIGS. 10 and 11 show a side damping member 6. As shown in FIG. 4, the moving block 4 is formed to have a saddle shape as a whole and has the central part 4a facing the upper surface of the raceway rail 1 and the stem parts 4b respectively facing the side surfaces of the raceway rail 1. As shown in FIG. 10, each side damping member 6, which extends in the movement directions of the moving block 4, is attached to the lower end of each stem part 4b.

Each of the side damping members 6 has a protruding part 6b whose outer contour is consistent with the outer shape of the raceway rail 1 so that a gap 19 between each side damping member 6 and the raceway rail 1 becomes narrow. In the similar way to the case for the foregoing end damping members 5, the gap 19 is set as its width to 0.05 to 0.25 mm, for instance. The protruding part 6b has a flat surface 6c facing the raceway rail 1. This gap 19 is filled with a layer of oil supplied through a not-shown oil supply passage. Thanks to the viscosity resistance of the oil layer that intervenes between each side damping member 6 and the raceway rail 1, the vibration can be damped.

The side damping members 6 function as means for preventing the balls 3 from dropping out of the moving block 4, when the moving block 4 is removed from the raceway rail 1. To give this function to the side damping members 6, a distance between an upper end 6a and the side damping member 6 and an upper end 18 of the loaded ball rolling groove 2a is made smaller than the diameter of each ball 3.

Figure 12:
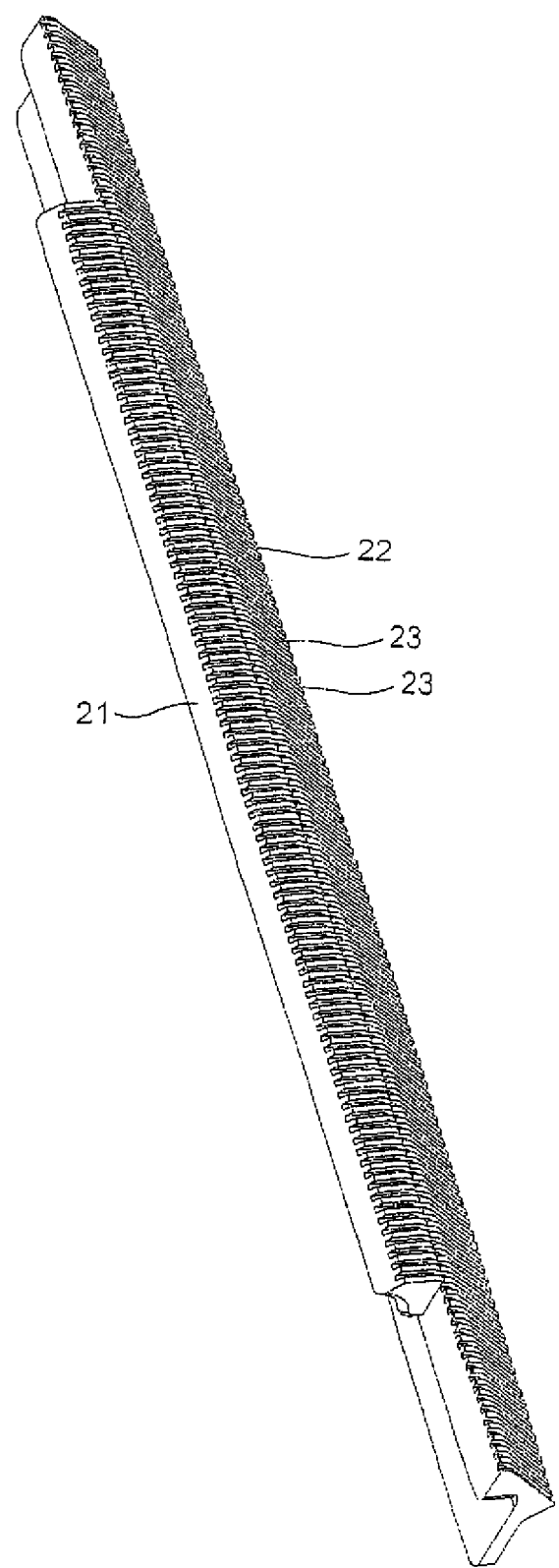
FIG. 12 is a perspective view showing another example of the side damping members.
Figure 13:
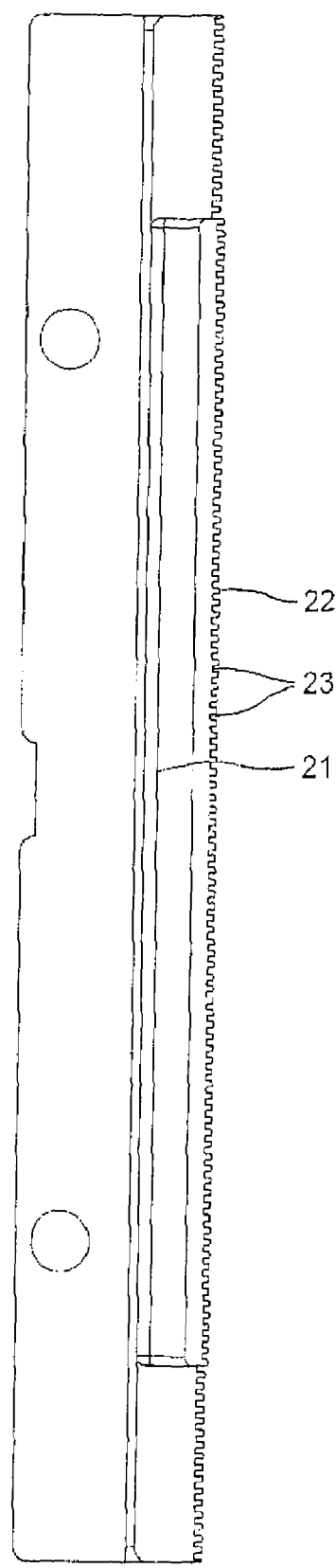
FIG. 13 is a plan view showing the side damping members shown in FIG. 12.

FIGS. 12 and 13 show another example of the side damping member. This example provides a side damping member 21, which has a surface 22 contacting a layer of oil. On the surface 22, there are formed a plurality of grooves 23 respectively extending in parallel with each other along a direction perpendicular to the movement directions of the moving member 2. This side damping member 21 moves together with the moving member 2 in the movement directions of the moving member 2. Providing the side damping member 21 with the plural grooves 23 formed thereon to extend in the direction perpendicular to the movement directions of the moving member 2 enables the side damping member 21 to have an improved capability of sustaining the oil.

Figure 14:
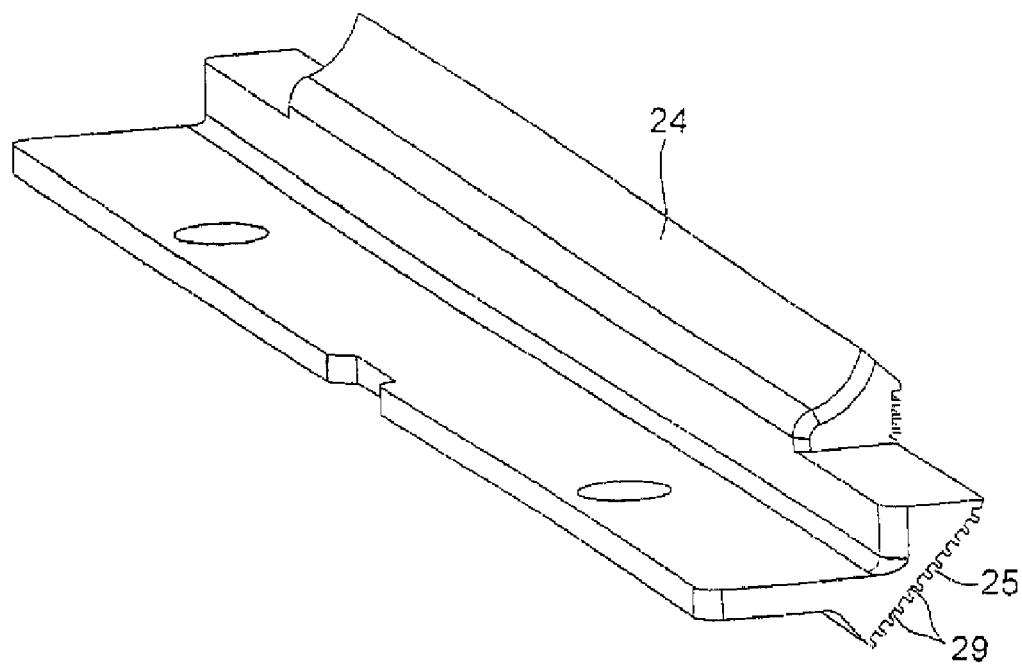
FIG. 14 is a perspective view showing another example of the side damping members.
Figure 15:
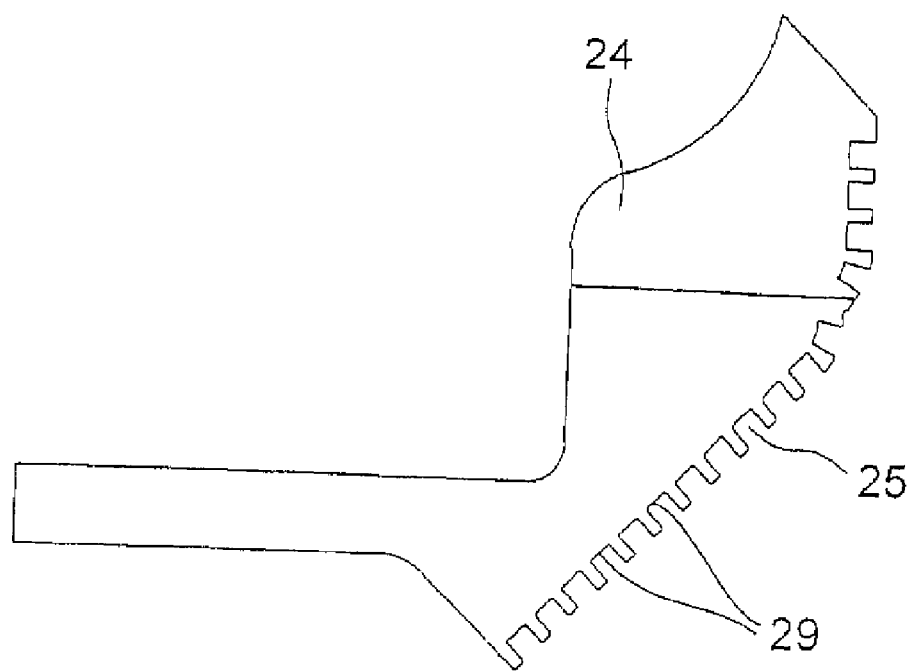
FIG. 15 is a frontal view showing the side damping members shown in FIG. 14.

FIGS. 14 and 15 show another example of the side damping member. This example provides a side damping member 24, which has a surface 25 contacting a layer of oil. On the surfaced 25, there are formed a plurality of grooves 29 respectively extending in parallel with each other along the movement directions of the moving member 2. This exemplified side damping member 24 has the plural grooves extending along the movement directions of the moving member 2, whereby it is possible to prevent the oil from flowing out of the side damping member 24 in the direction (for example, a downward direction) perpendicular to the movement directions of the moving member 2. The plural grooves formed on the said damping member 24 increase an area contacting the oil, thus realizing an increase in the viscosity resistance. This structure also makes it more difficult to that oil flows out of the gap. The extending direction of the grooves 29 may not always be parallel with the movement directions of the moving member 2, but may be a direction intersecting the movement directions.

Figure 16:
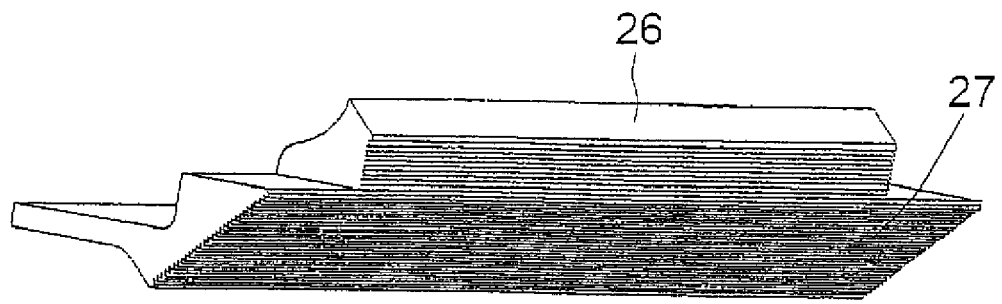
FIG. 16 is a perspective view showing another example of the side damping members.
Figure 17:
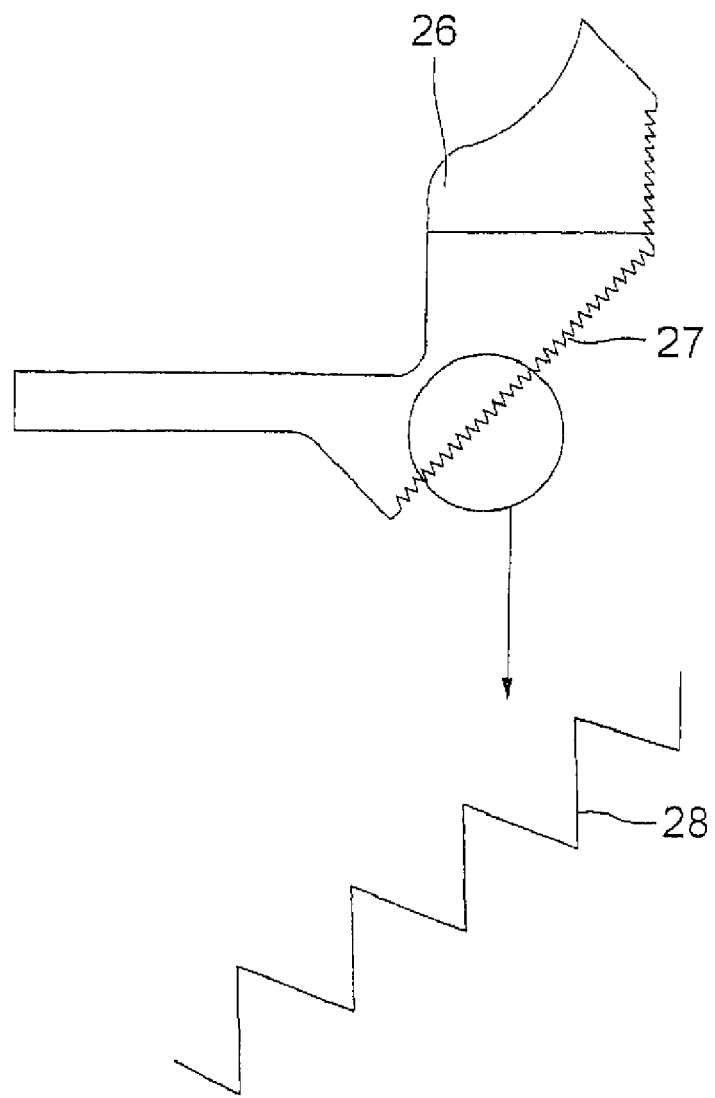
FIG. 17 is a frontal view showing the side damping members shown in FIG. 16.

FIGS. 16 and 17 show another example of the side damping member 24. In this example, there is provided a side damping member 26 having a surface contacting a layer of oil and grooves 28 each having a triangular section are formed on the surface 27. The sectional form of each groove 28 may be triangular as shown in this example.

Figure 18:
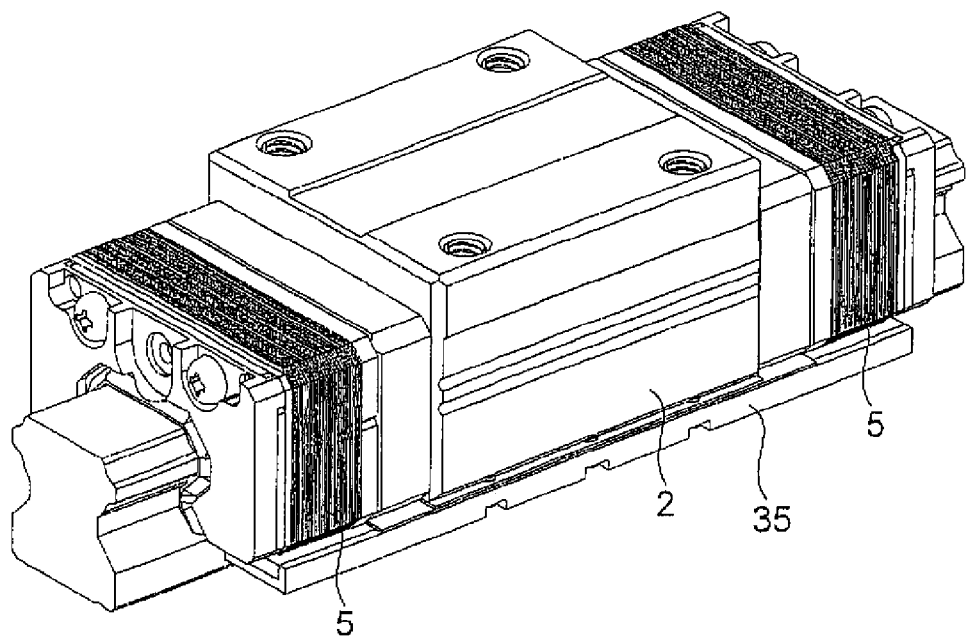
FIG. 18 is a perspective view showing the motion guide device to which an oil retaining member is attached.
Figure 19:
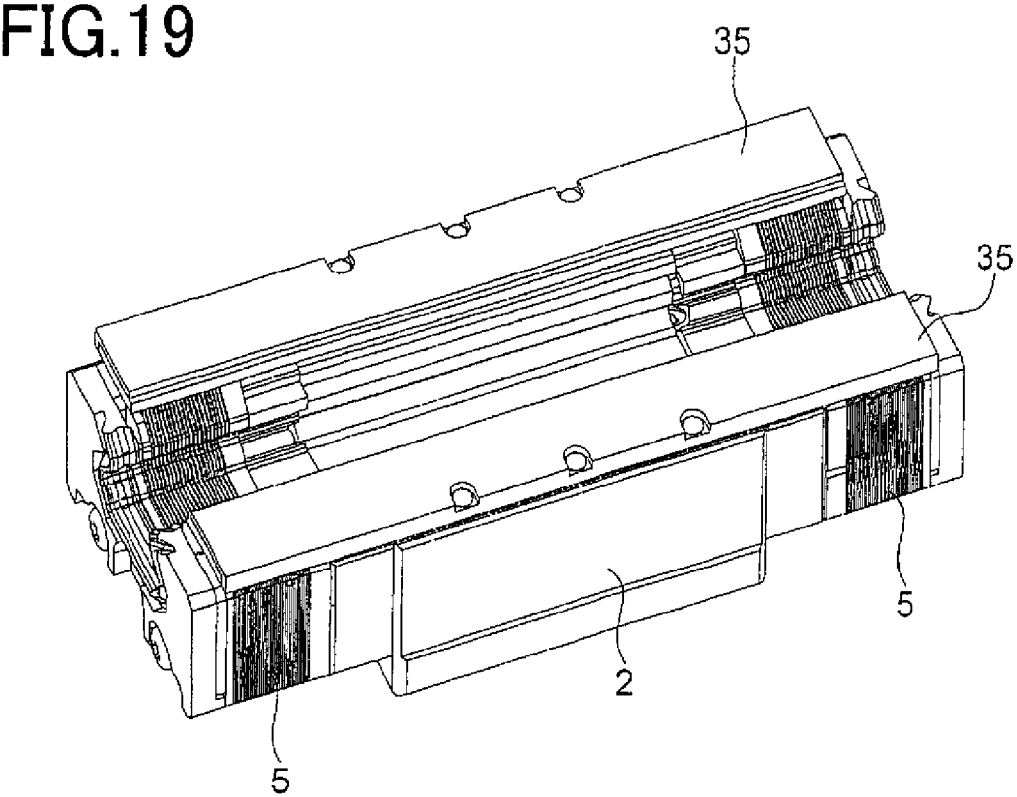
FIG. 19 is a perspective view showing a bottom-side portion of a moving member.

FIGS. 18 and 19 exemplifies a structure in which the damping member 2 of the motion guide device according to the foregoing embodiments is provided with an oil retaining member 35 on the lower surface of the device. The oil retaining member retains oil therein. The oil flows, little by little, out of the gap 16 between each end damping member 5 and the raceway rail 1 and the gap 19 between each side damping member 24 and the raceway rail 1, respectively. Thus the oil retaining member 35 sucks in the oil flowing from the gaps 16 and 19 in order to prevent the oil flowing out of the motion guide device.

Figure 20:
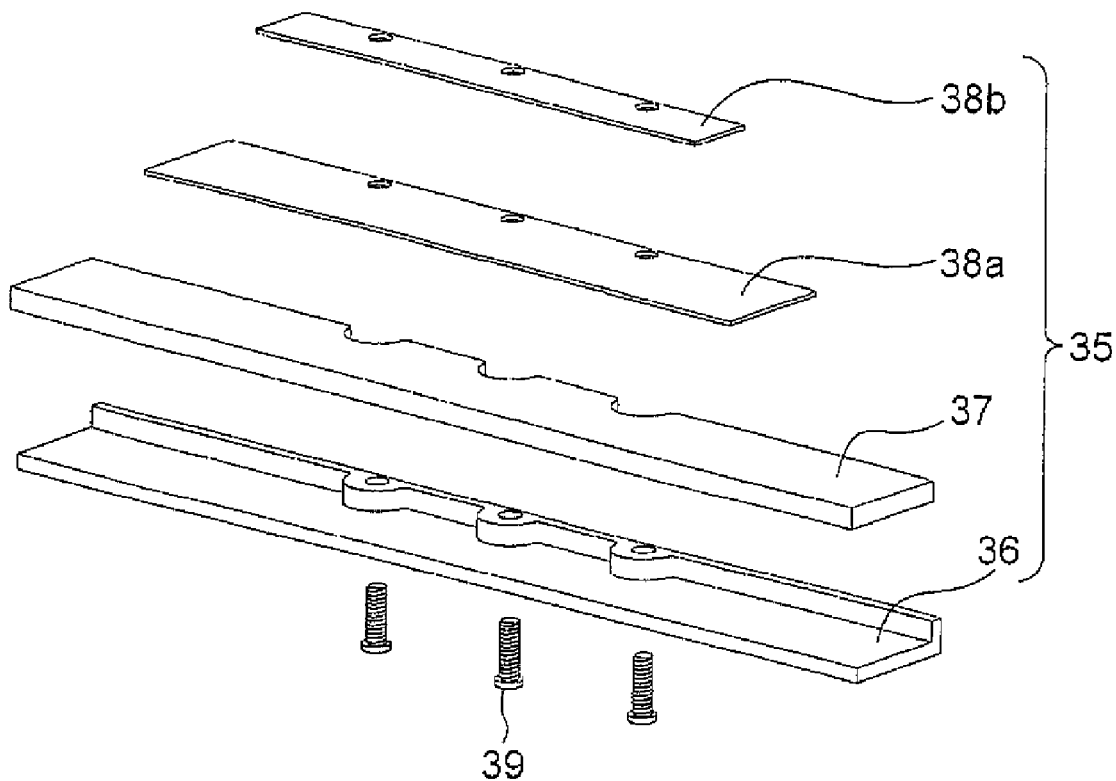
FIG. 20 is a disassembled perspective view of the oil retaining member.

FIG. 20 shows a disassembled perspective view of the oil retaining member 35. The oil retaining member 35 is provided with an oil sucking-in element 37, such as sponge, to suck in oil and a casing 36 covering the lower side of the oil sucking element 37. To suck in the oil, the sucking-in element 37 is placed to come into contact with the end and side damping members 5 and 24. Besides this, the sucking-in element 37 is arranged to come into contact with the raceway rail 1 as well to prevent the oil from leaking out.

On the upper surface of the oil sucking-in element 37, oil sucking-in element isolating plates 38a and 38b are arranged. This arrangement is done in light of the fact that some shapes of the moving block 2 may cause a gap between the oil sucking-in element 37 and the moving block 2. If there is a gap, arranging the oil sucking-in element 37 results in failure in retaining the oil, with the oil leaked out. The oil sucking-in element isolating plates 38a and 38b are disposed to fill in such a gap. The assembled oil retaining member 35 is secured to the moving block 2 by means of setscrews or other securing members.

Figure 21:
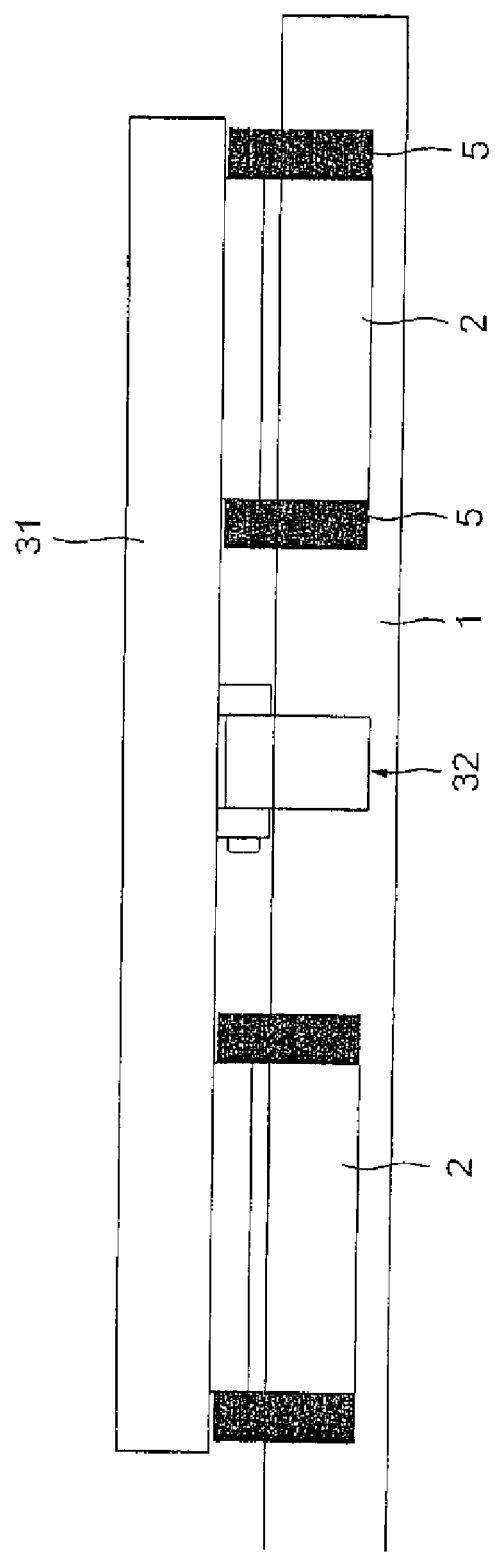
FIG. 21 is a side view showing a table apparatus according to an embodiment of the present invention.

FIG. 21 shows a table apparatus adopted by another embodiment according to the present invention. This table apparatus is configured by attaching a table 31 to the moving member 2 of the motion guide device according to the foregoing embodiment. A moving member is mounted on an upper surface of the table 31, while the raceway rail 1 is secured to a frame or others of a machine and the moving member 2 moving linearly is assembled with the raceway rail 1. In the present embodiment, the two moving members 2 are assembled with the one raceway rail 1. This motion guide device is similar in structure to that adopted by the foregoing embodiment, the identical reference numerals are given for the sake of omitting their explanations.

The table 31 has a lower surface on which the damping member 32 is secured. The damping member 32 is secured to surround the raceway rail 1 and moves along the raceway rail 1. The damping member 32 is almost the same in structure as the foregoing end damping member 5. In other words, the damping member 32 has an opening of which contour is identical with the outer shape of the raceway rail 1 and moves with a slight gap from the raceway rail 1, without contacting the raceway rail 1. The gap between the damping member 32 and the raceway rail 1 is filled with a layer of oil. The viscosity resistance of the oil is able to generate a braking force in proportion to a movement speed of the table 31, so that the vibration of the table 31 can be damped.

Incidentally the present invention can be modified within a range with no change given to the present invention. For example, the damping structure according to the present invention can be applied to motion guide devices such as ball splines and ball screws, not limited to the linear guide. Further, the raceway rail may extend straightly or bent in a curve. When the raceway rail is bent in a curve, the moving block makes a curved movement relatively to along the raceway rail. Still further, the surface of the damping member that comes in contact with the oil may not be concavo-convex, but may be planar. Moreover, the end damping member is constructed by laminating the thin plates on one another, but may by constructed by employing a solid member with a plurality of grooves formed thereon.

Embodiment

Figure 22:
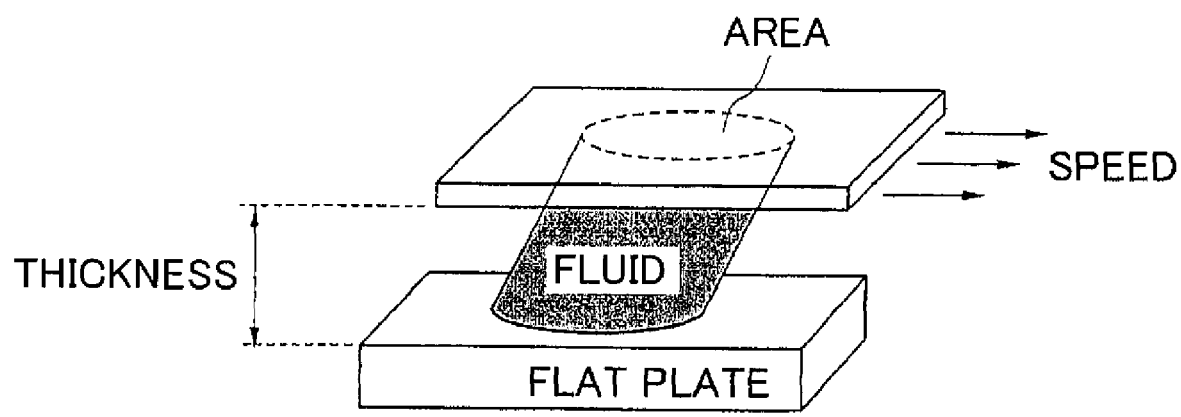
FIG. 22 shows a model of viscosity resistance.

The following "numeral 1" formula indicates how to calculate the viscosity resistance of oil. FIG. 22 shows a model of parameters employed by this calculation formula.

$$v\,(1/s) = \frac{V\,(m/s)}{h\,(m)} \quad\quad \text{[Numeral 1]}$$

$$\tau\,(Pa) = \frac{F\,(N)}{A\,(m^2)}$$

$$\eta\,(Pa\cdot s) = \frac{\tau\,(Pa)}{v\,(1/s)}$$

$$\varepsilon\,(mm^2/s) = \frac{\frac{\eta\,(Pa\cdot s)}{10^3}}{\rho\,(g/cm^3)},$$

accordingly, $$F(N) = \eta\,(Pa\cdot s)\cdot A\,(m^2)\cdot \frac{V\,(m/s)}{h\,(m)}$$

$$= \varepsilon\,(mm^2/s)\cdot \rho\,(g/cm^3)\cdot$$

$$A\,(m^2)\cdot \frac{V\,(m/s)\cdot 10^3}{h\,(m)},$$

where γ is a shear rate, V is a speed, h is a height, τ is a shear strain, F is a viscosity resistance, A is a contact area, η is a viscosity, ε is a kinetic viscosity, and ρ is a density.

One of the parameters having an influence on the viscosity resistance F is the speed V. The faster the movement speed of the moving member 2, the larger the viscosity resistance F. The height h is the height of a layer of oil, that is, the width of the gap 16 between each end damping member 5 and the raceway rail 1. The narrower the gap 16, the larger the viscosity resistance F. In addition, the larger the contact area A, the larger the viscosity resistance F. By forming each of the end damping members 5 so that the member has a concavo-convex area contacting the layer of oil, the contact area becomes larger, increasing the viscosity resistance F. As the kinetic viscosity of the oil becomes larger, the viscosity resistance F becomes larger as well.

The foregoing "numeral 1" formula for the viscosity resistance was used to calculate examples of the viscosity resistance, which resulted in the followings (1) to (3):

(1) In a condition under which oil having a kinetic viscosity ($mm^2/s$) of 200.0 (40° C.) and a density ($g/cm^2$) of 0.88 is used and a speed is 0.1 m/s, gap seal is given by an "end+side" viscosity resistance of 0.016 N.

(2) In a condition under which oil having a kinetic viscosity ($mm^2/s$) of 200.0 (40° C.) and a density ($g/cm^2$) of 0.88 is used and a speed is 1 m/s, gap seal is given by an "end+side" viscosity resistance of 1.6 N.

(3) In a condition under which oil having a kinetic viscosity ($mm^2/s$) of 1000.0 (40° C.) and a density ($g/cm^2$) of 0.88 is used and a speed is 0.01 m/s, gap seal is given by an "end+ side" viscosity resistance of 0.08 N.

Figure 23:
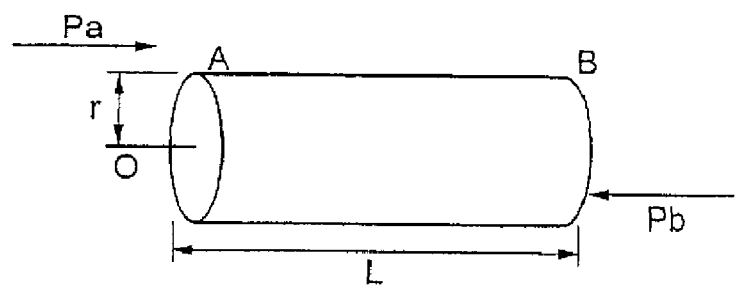
FIG. 23 shows a model of an oil supply passage.

Secondly how much pressure to the oil is required to supply the oil to the gap was calculated based on Hagen-Poiseuille's formula. In this calculation, the shape of the oil supply passage was simplified into a model (a cylindrical shape with a radius of 0.1 mm), as shown in FIG. 23.

$$v = \Delta P(r_0^2 - r^2)/4 \mu L$$

$$\Delta P = 4v\mu L/(r_0^2 - r^2), \quad \text{[Numeral 2]}$$

where $v$ is a speed distribution (m/s), $\Delta P$ is a pressure difference (Pa), $r_0$ is a radius of a tube (m), r is a position at the speed is calculated (m), $\mu$ is a viscosity of oil (Pa·s=10P=10$\rho\eta$), L is a movement length (m), $\rho$ is a density (g/cm$^3$), P is a pump pressure (Pa), and $\eta$ is a kinetic viscosity of oil (St).

$$\Delta P = (P - 10^5), r = 0 \quad \text{[Numeral 3]}$$

Using the "Numeral 3" and "Numeral 4" formulae, a minimum pressure was obtained. The speed v was regarded as an outgoing speed of the oil and handled as being 0.0035351 m/s. Thus the following "Numeral 4" formula was obtained.

$$P = 4 \times 0.003531 \times 10 \times 0.88 \times 220 \times 0.01 \times \quad \text{[Numeral 4]}$$
$$18.11/1000/((0.1/1000)^2 - 0^2) + 10^5$$
$$= 595776$$
$$= 5.96 \times 10^5 \text{ (Pa)}$$

From "Numeral 4" formula, it was found that applying an approximately 6 Pa at the lowest allows the oil to flow.

The present specification is based on Japanese Patent Application Nos. 2004-331221 filed on Nov. 15, 2004 and 2005-315299 filed on Oct. 28, 2005, entire content of which is expressly incorporated by reference herein.

What is claimed is:

1. A motion guide device, characterized in that the device comprises
    a raceway member having a rolling-element rolling part;
    a moving member having a loaded rolling-element rolling part facing the rolling-element rolling part and being allowed to make a linear or curved movement relatively to the raceway member;
    a plurality of rolling elements intervening between the rolling-element rolling part of the raceway member and the loaded rolling-element rolling part of the moving member; and
    a layer of oil filled in a gap between the raceway member and the moving member such that the layer of oil contacts the raceway member and the moving member,
    the moving member having a moving block on which the loaded rolling-element rolling part is formed, and an end damping member which is separate from the moving block and attached to an end face of the moving block in a movement direction of the moving block,
    the layer of oil being filled in a gap between the end damping member and the raceway member, and viscosity resistance of the oil being utilized to apply a braking force to the moving member or the raceway member in proportion to a speed,
    the end damping member having a plurality of first thin plates and a plurality of second thin plates, the first and second plates being laminated on one another alternately between the first and second plates,
    the first plates and the second plates having an opening formed therein to be consistent in shape with the raceway member, and
    a gap between the second plates and the raceway member being larger than a gap between the first plates and the raceway member so that the end damping member has a surface contacted by the layer of oil and shaped to become the concavo-convex surface in a condition where the first plates and the second plates are laminated.

2. The motion guide device according to claim 1, characterized in that the end damping member has an oil supply passage supplying the oil to the gap and the oil flows out from the gap.

3. The motion guide device according to claim 1 or 2, characterized in that
    the end damping member has a surface to which the layer of oil is contacted, the surface being formed to be concavo-convex.

4. The motion guide device according to claim 1, characterized in that
    the second plates have a slit formed therein for supplying oil to the gap between the end damping member and the raceway member, and
    the first plates and the second plates have an oil supply hole formed therein for supplying the oil to the slit formed in the second plates in the condition where the first plates and the second plates are laminated.

5. The motion guide device according to claim 1, characterized in that:
    the moving member has a side damping member which is separate from the moving block and attached to the moving block,
    the moving block has a central part facing an upper surface of the raceway member and a stem part facing a side surface of the raceway member, the moving block being formed into a saddle shape as a whole, and the side damping member being attached to the stem part of the moving block, and
    the layer of oil is filled in a gap between the side damping member and the raceway member, and viscosity resistance of the oil being utilized to apply a braking force to the moving member or the raceway member in proportion to a speed.

6. The motion guide device according to claim 5, characterized in that
    the side damping member has a plurality of grooves each extending a direction intersecting a movement direction of the moving member.

7. The motion guide device according to claim 5, characterized in that
    the side damping member has a plurality of grooves each extending along a movement direction of the moving member.

8. A table apparatus, comprising:
    the motion guide device according to claim 1; and
    a table attached to the moving member of the motion guide device.

9. The table apparatus according to claim 8, characterized in that
    the moving member has a side damping member which is separate from the moving block and attached to the moving block,
    the moving block has a central part facing an upper surface of the raceway member and a stem part facing a side surface of the raceway member, the moving block being formed into a saddle shape as a whole, and the side damping member being attached to the stem part of the moving block, and the layer of oil is filled in a gap between the side damping member and the raceway member, and viscosity resistance of the oil being utilized to apply a braking force to the table in proportion to a speed.

10. A damping method for a motion guide device having a raceway member having a rolling-element rolling part, a moving member having a loaded rolling-element rolling part facing the rolling-element rolling part and being allowed to make a linear or curved movement relatively to the raceway member, and a plurality of rolling elements intervening between the rolling-element rolling part of the raceway member and the loaded rolling-element rolling part of the moving member, the moving member having a moving block on which the loaded rolling-element rolling part is formed, and an end damping member which is separate from the moving block and attached to an end face of the moving block in a movement direction of the moving block, and the damping method comprising:

filling a layer of oil into a gap between the end damping member and the raceway member such that the layer of oil contacts the end damping member and the raceway member; and utilizing viscosity resistance of the oil to apply a braking force to the moving member or the raceway member in proportion to a speed, wherein the end damping member has a plurality of first thin plates and a plurality of second thin plates, the first and second plates being laminated on one another alternately between the first and second plates, the first plates and the second plates have an opening formed therein to be consistent in shape with the raceway member, and a gap between the second plates and the raceway member is larger than a gap between the first plates and the raceway member so that the end damping member has a surface contacted by the layer of oil and shaped to become the concavo-convex surface in a condition where the first plates and the second plates are laminated.

11. The damping method according to claim 10, characterized in that the moving member has a side damping member which is separate from the moving block and attached to the moving block, the moving block having a central part facing an upper surface of the raceway member and a stem part facing a side surface of the raceway member, the moving block being formed into a saddle shape as a whole, and the side damping member being attached to the stem part of the moving block, and the damping method further comprises:

filling a layer of oil into a gap between the side damping member and the raceway member such that the layer of oil contacts the side damping member and the raceway member.

\* \* \* \* \*